(12) United States Patent
Yokoyama et al.

(10) Patent No.: US 6,603,587 B1
(45) Date of Patent: Aug. 5, 2003

(54) OPTICAL AMPLIFIER REPEATER

(75) Inventors: Ryu Yokoyama, Tokyo (JP); Shuji Yamashita, Tokyo (JP); Yasuhiro Aoki, Tokyo (JP); Kenichi Yoneyama, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/374,440

(22) Filed: Aug. 13, 1999

(30) Foreign Application Priority Data

Aug. 14, 1998 (JP) .......................................... 10-242602

(51) Int. Cl.[7] .............................................. H04B 10/16
(52) U.S. Cl. ...................................... 359/179; 359/341
(58) Field of Search ................................ 359/179, 174, 359/110, 333, 341

(56) References Cited

U.S. PATENT DOCUMENTS

| | | | | |
|---|---|---|---|---|
| 5,636,301 A | * | 6/1997 | O'Sullivan et al. | 385/24 |
| 5,737,105 A | | 4/1998 | Ohta et al. | 359/179 |
| 5,995,254 A | * | 11/1999 | Koga et al. | 359/110 X |
| 6,301,036 B1 | * | 10/2001 | Spencer | 359/179 |
| 6,301,404 B1 | * | 10/2001 | Yoneyama | 359/179 X |

FOREIGN PATENT DOCUMENTS

| | | |
|---|---|---|
| EP | 0685946 | 12/1995 |
| JP | 32731 | 2/1989 |
| JP | 97629 | 3/1992 |
| JP | 344067 | 12/1993 |
| JP | 6-204949 | 7/1994 |
| JP | 268600 | 9/1994 |
| JP | 8-181656 | 7/1996 |
| JP | 18411 | 1/1997 |
| JP | 116502 | 5/1997 |
| JP | 191291 | 7/1997 |
| JP | 51401 | 2/1998 |
| JP | 266205 | 9/1999 |
| JP | 31907 | 1/2000 |
| WO | 23965 | 7/1997 |

OTHER PUBLICATIONS

European Search Report (in English) issued May 26, 2000 in a related application.
Patent Abstracts of Japan, vol. 015, No. 179 (E–1064), May 8, 1991 & JP 03 042927 A (Nippon Telegr & Teleph Corp), Feb. 25, 1991, *abstract*.
Japanese Office Action issued Mar. 27, 2001 in a related application with English translation of relevant portions.

* cited by examiner

*Primary Examiner*—Thomas Mullen
(74) *Attorney, Agent, or Firm*—Dickstein, Shapiro, Morin & Oshinsky, LLP.

(57) ABSTRACT

An optical amplifier repeater is provided having a first optical amplifier that amplifies a main signal light and supervisory signal light transmitted on an up optical-fiber transmission line and a second optical amplifier that amplifies the main signal light and supervisory signal light transmitted on a down optical-fiber transmission line. Further, a transfer unit that is provided transfers part of the supervisory signal light transmitted on the up optical-fiber transmission line onto the down optical-fiber transmission line and transfers part of the supervisory signal light transmitted on the down optical-fiber transmission line onto the up optical-fiber transmission line. The transfer unit has an optical amplifier output side transfer unit that transfers supervisory signal light reflected by a first light-reflecting device inserted to the output side of the first optical amplifier to the output side of the second optical amplifier, and transfers the supervisory signal light reflected by a second light-reflecting device inserted to the output side of the second optical amplifier to the output side of the first optical amplifier.

45 Claims, 13 Drawing Sheets

OPTICAL AMPLIFIER REPEATER

FIELD OF THE INVENTION

This invention relates to an optical amplifier repeater that is inserted into the optical transmission line to compensate the attenuation of optical signal on the optical transmission line and to supervise the optical transmission line.

BACKGROUND OF THE INVENTION

Regarding the prior art to the invention, for example, Japanese patent application laid-open No. 6-204949 (1994) (hereinafter referred as 'prior art 1') titled "Optical Transmission System" discloses an optical amplifier repeater.

FIG. 1 is a block diagram showing the composition of the optical amplifier repeater in prior art 1. In FIG. 1, 1 is the optical amplifier repeater, 2a is a first optical amplifier, 2b is a second optical amplifier, 3a is a first optical coupler, 3b is a second optical coupler, 4a is a first optical attenuator, and 4b is a second optical attenuator.

The up optical-fiber transmission line and down optical-fiber transmission line comprise opposed lines.

FIG. 2 is a block diagram showing the operation of the optical amplifier repeater 1. In FIG. 2, like parts are indicated by like reference numerals as used in FIG. 1. Optical signals with four wavelengths $\lambda 1$ to $\lambda 4$ transmitted through the up optical-fiber transmission line are wavelength-multiplexed, and supervisory signal light with a wavelength of $\lambda sv1$ is added thereto.

Optical signal on the up optical-fiber transmission line is output through the first optical coupler 3a, the first optical attenuator 4a and the second optical coupler 3b to the down optical-fiber transmission line. Supervisory signal light output to the down optical-fiber transmission line is received and measured by a transmission terminal on the up optical-fiber transmission line, whereby the monitoring of the transmission line is conducted.

However, in the above monitoring method explained in FIG. 2, there is a problem as described below. Namely, since losses at the first optical coupler 3a, the first optical attenuator 4a and the second optical coupler 3b are almost equal for each wavelength, optical signal with wavelengths on the up optical-fiber transmission line is transferred to the down optical-fiber transmission line while having the ratio of intensity only moderately changed. Thus, main signal transferred from the up optical-fiber transmission line to the down optical-fiber transmission line interferes with the main signal transferred through the down optical-fiber transmission line, reducing the signal-to-noise ratio.

Although the intensity of main signal light transferred from the up optical-fiber transmission line to the down optical-fiber transmission line may be sufficiently weakened to prevent the S/N ratio from being reduced, the intensity of supervisory signal light transferred from the up optical-fiber transmission line to the down optical-fiber transmission is also weakened. Therefore, there is a problem in that a high-precision reception circuit is needed to receive such supervisory signal light.

Also, Japanese patent application laid-open No. 8-181656 (1996) (hereinafter referred as 'prior art 2') titled "Monitoring Device for Optical WDM Communication Transmission Line" discloses another prior art optical amplifier repeater.

FIG. 3 is a block diagram showing the composition of the optical amplifier repeater in the second prior art. In FIG. 3, like or corresponding parts are indicated by like reference numerals as used in FIG. 1 and the explanations thereof are omitted.

Meanwhile, in all of the drawings attached to this specification, like or corresponding parts are indicated by like reference numerals and the explanations thereof are omitted herein.

In FIG. 3, 20a is a first optical bandpass filter and 20b is a second optical bandpass filter. These optical bandpass filters are designed to pass only supervisory signal light.

FIG. 4 is a block diagram showing the operation of the optical amplifier repeater 1 in FIG. 3. Although, compared with the operation in prior art 1 in FIG. 2, the intensity of main signal light transferred from the up optical-fiber transmission line to the down optical-fiber transmission line is attenuated by the selectivity of the optical bandpass filter, main signal light with wavelengths near the supervisory signal light is not sufficiently attenuated.

This is because the transmission band of the optical bandpass filter is difficult to sharply define sufficiently (see the transmittance of optical filter in FIG. 4). Therefore, there is a problem in that the main signal light, with a wavelength adjacent to the supervisory signal light, interferes with the main signal light transmitted through the down optical-fiber transmission line to deteriorate its characteristic.

In order to prevent the characteristic from deteriorating, the wavelength of supervisory signal light is located apart from the wavelength of the main signal light. However, it is then required to undesirably widen the amplification wavelength band of the optical amplifier.

SUMMARY OF THE INVENTION

Accordingly, it is an object of the invention to provide an optical amplifier repeater where only the supervisory signal light can be transferred from the up optical-fiber transmission line to the down optical-fiber transmission line.

It is a further object of the invention to provide an optical amplifier repeater that supervisory signal light can be transferred to the opposed transmission line from both the output side and input side of optical amplifier.

It is a still further object of the invention to provide an optical amplifier repeater that the return circuit between the up and down optical-fiber transmission lines is connected by one optical transmission line.

According to the invention, an optical amplifier repeater, comprises:

a first optical amplifier that amplifies main signal light and supervisory signal light transmitted on an up optical-fiber transmission line;

a second optical amplifier that amplifies main signal light and supervisory signal light transmitted on a down optical-fiber transmission line;

a transfer means that transfers part of supervisory signal light transmitted on the up optical-fiber transmission line onto the down optical-fiber transmission line, and that transfers part of supervisory signal light transmitted on the down optical-fiber transmission line onto the up optical-fiber transmission line;

wherein the transfer means comprises an optical amplifier output side transfer means that transfers supervisory signal light reflected by a first light-reflecting means inserted to the output side of the first optical amplifier to the output side of the second optical amplifier, and transfers supervisory signal light reflected by a second light-reflecting means inserted to the output side of the second optical amplifier to the output side of the first optical amplifier.

According to another aspect of the invention, an optical amplifier repeater, comprises:

a first optical amplifier that amplifies main signal light and supervisory signal light transmitted on an up optical-fiber transmission line;

a second optical amplifier that amplifies main signal light and supervisory signal light transmitted on a down optical-fiber transmission line;

a transfer means that transfers part of supervisory signal light transmitted on the up optical-fiber transmission line onto the down optical-fiber transmission line, and that transfers part of supervisory signal light transmitted on the down optical-fiber transmission line onto the up optical-fiber transmission line;

wherein the transfer means comprises an optical amplifier input side transfer means that transfers supervisory signal light reflected by a third light-reflecting means inserted to the input side of the first optical amplifier to the output side of the second optical amplifier, and transfers supervisory signal light reflected by a fourth light-reflecting means inserted to the input side of the second optical amplifier to the output side of the first optical amplifier.

According to another aspect of the invention, an optical amplifier repeater, comprises:

a first optical amplifier that amplifies main signal light and supervisory signal light transmitted on an up optical-fiber transmission line;

a second optical amplifier that amplifies main signal light and supervisory signal light transmitted on a down optical-fiber transmission line;

a transfer means that transfers part of supervisory signal light transmitted on the up optical-fiber transmission line onto the down optical-fiber transmission line, and that transfers part of supervisory signal light transmitted on the down optical-fiber transmission line onto the up optical-fiber transmission line;

wherein the transfer means comprises an optical amplifier output side transfer means that transfers supervisory signal light reflected by a first light-reflecting means inserted to the output side of the first optical amplifier to the output side of the second optical amplifier, and transfers supervisory signal light reflected by a second light-reflecting means inserted to the output side of the second optical amplifier to the output side of the first optical amplifier, and an optical amplifier input side transfer means that transfers supervisory signal light reflected by a third light-reflecting means inserted to the input side of the first optical amplifier to the output side of the second optical amplifier, and transfers supervisory signal light reflected by a fourth light-reflecting means inserted to the input side of the second optical amplifier to the output side of the first optical amplifier.

According to another aspect of the invention, an optical amplifier repeater, comprises:

a first optical amplifier that amplifies main signal light and supervisory signal light transmitted on an up optical-fiber transmission line;

a second optical amplifier that amplifies main signal light and supervisory signal light transmitted on a down optical-fiber transmission line;

a transfer means that transfers part of supervisory signal light transmitted on the up optical-fiber transmission line onto the down optical-fiber transmission line, and that transfers part of supervisory signal light transmitted on the down optical-fiber transmission line onto the up optical-fiber transmission line;

wherein the transfer means comprises a first light-reflecting means that is connected to the forward output port of the second-order side transmission line of a first optical coupler disposed on the output side of the first optical amplifier, a second light-reflecting means that is connected to the forward output port of the second-order side transmission line of a second optical coupler disposed on the output side of the second optical amplifier, a third light-reflecting means that is connected to the forward output port of the second-order side transmission line of a third optical coupler disposed on the input side of the first optical amplifier, a fourth light-reflecting means that is connected to the forward output port of the second-order side transmission line of a fourth optical coupler disposed on the input side of the second optical amplifier, an optical transmission line that connects between the reverse output port of the second-order side transmission line of the fourth optical coupler and the reverse output port of the second-order side transmission line of the first optical coupler, and an optical transmission line that connects between the reverse output port of the second-order side transmission line of the second optical coupler and the reverse output port of the second-order side transmission line of the third optical coupler.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
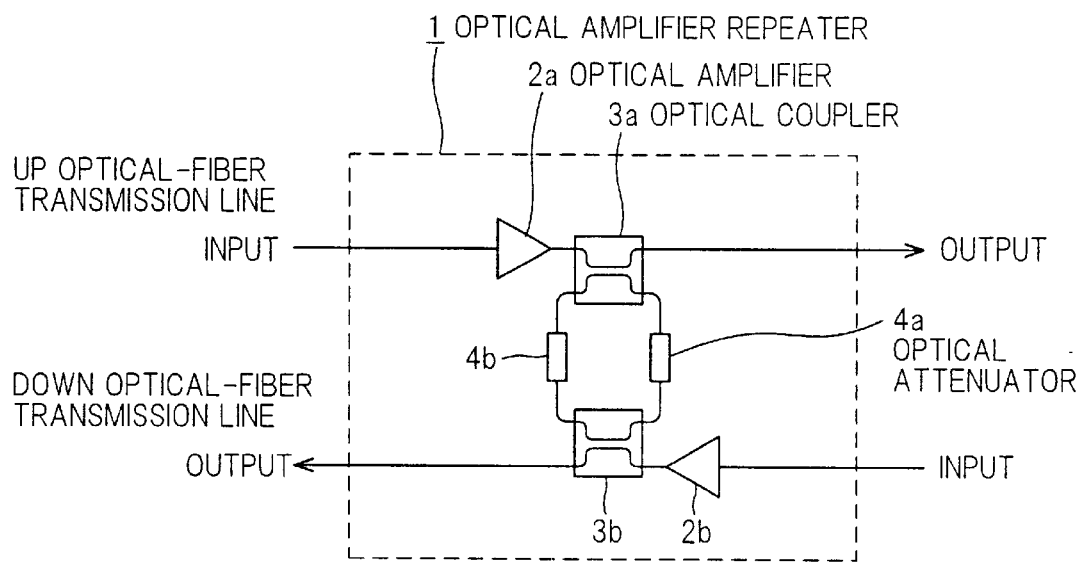
FIG. 1 is a block diagram showing the conventional optical amplifier repeater in prior art 1.
Figure 2:
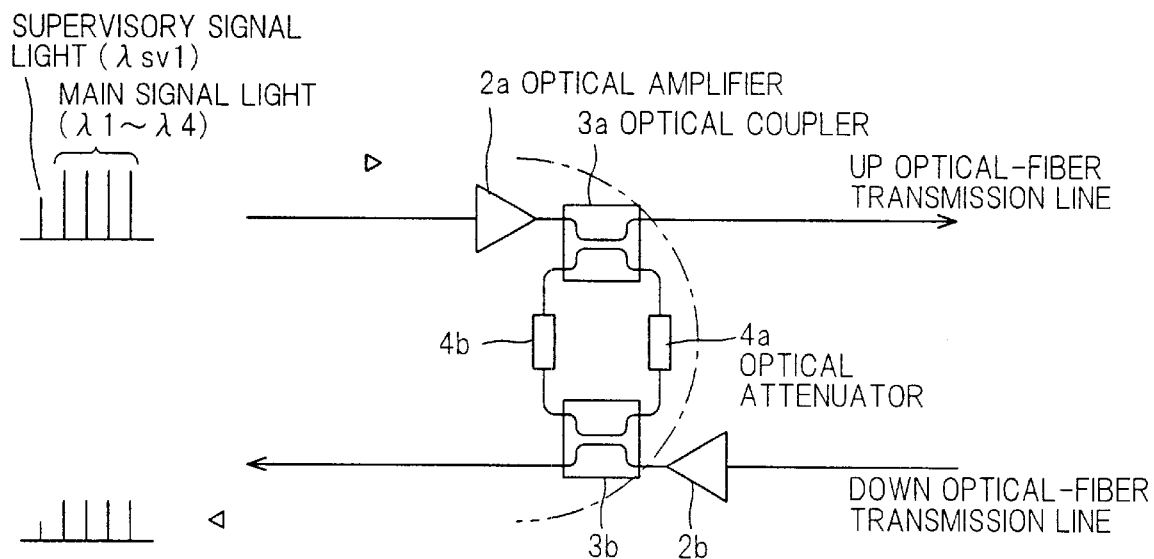
FIG. 2 is a block diagram showing the operation of the optical amplifier repeater in FIG. 1.
Figure 3:
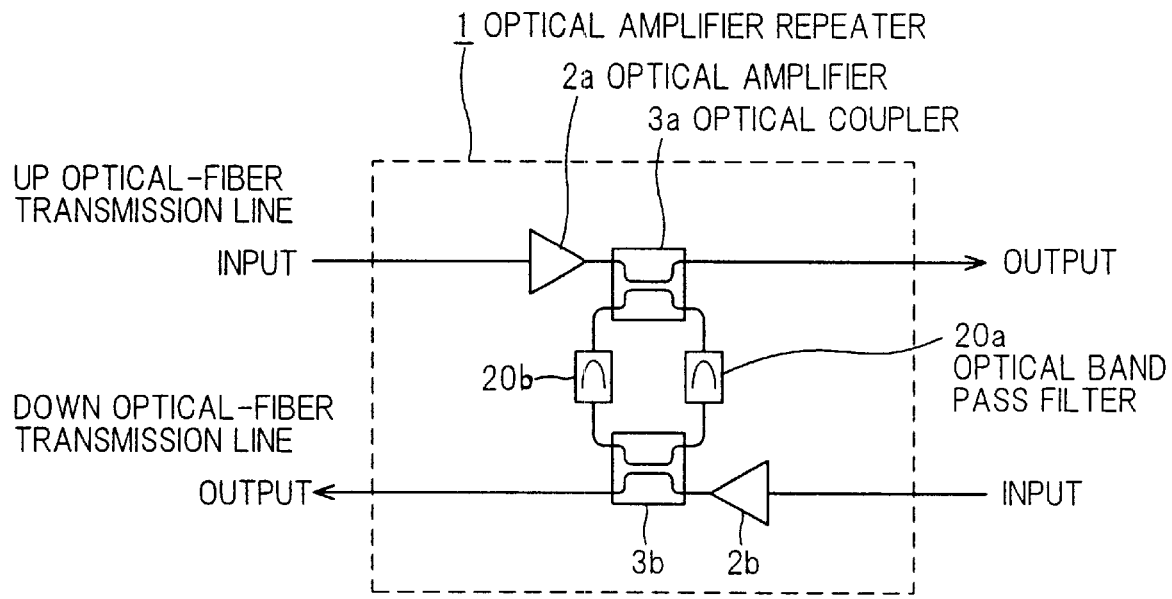
FIG. 3 is a block diagram showing the other conventional optical amplifier repeater in prior art 2.
Figure 4:
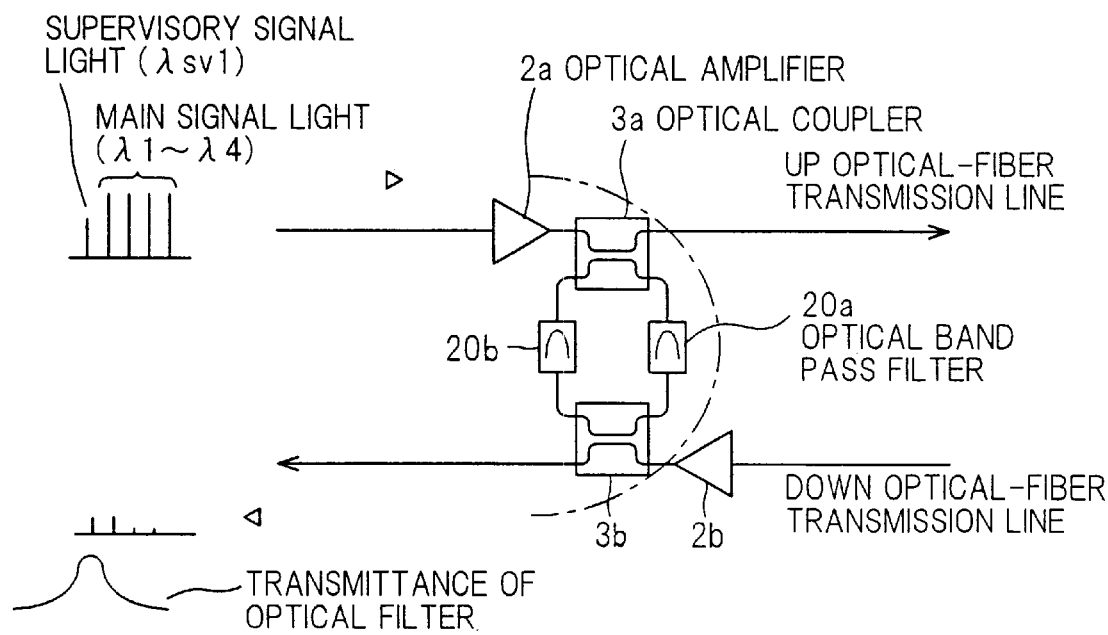
FIG. 4 is a block diagram showing the operation of the optical amplifier repeater in FIG. 3.

The preferred embodiments of this invention will be explained below, referring to the drawings.

Figure 5:
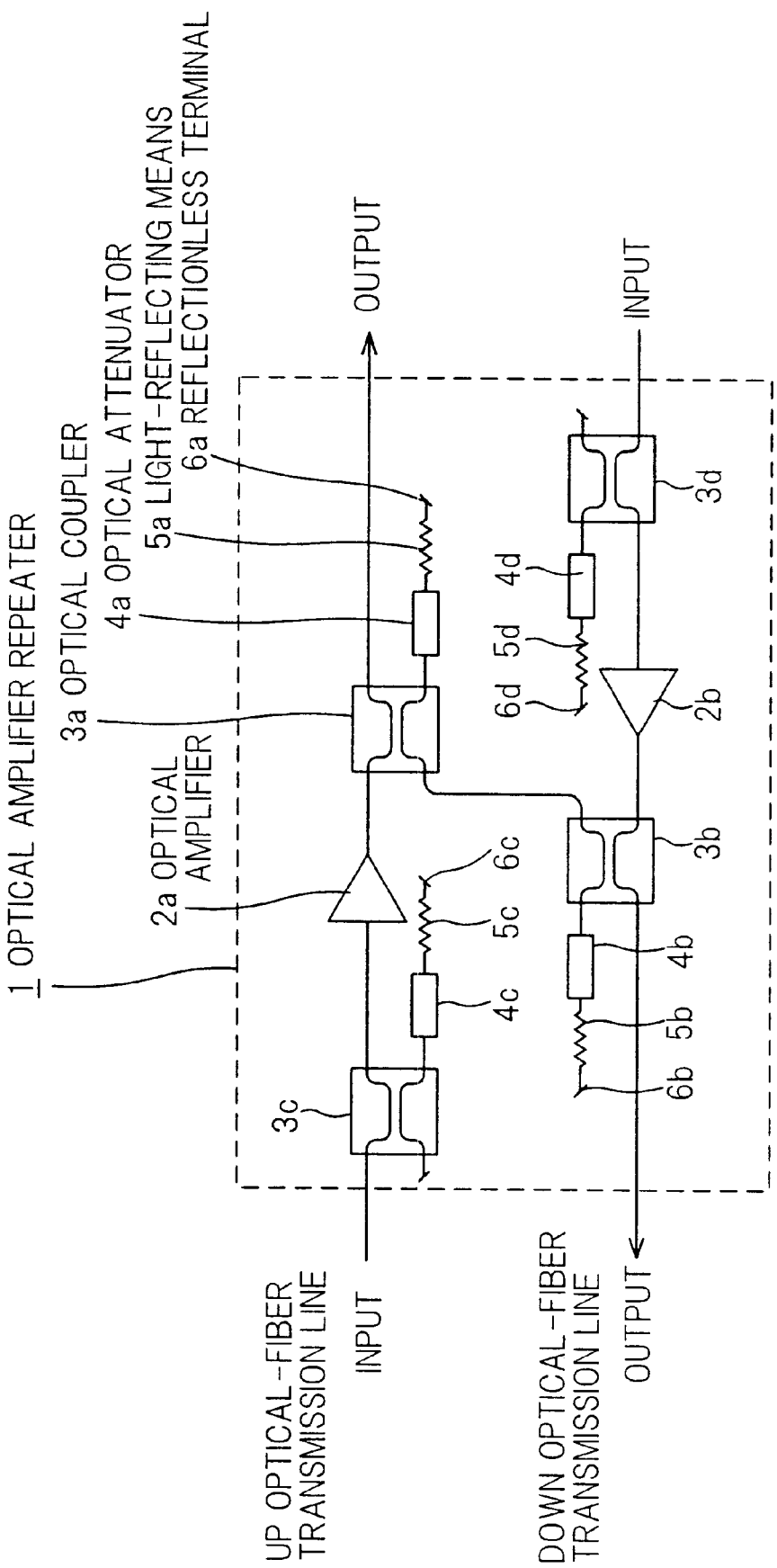
FIG. 5 is a block diagram showing an optical amplifier repeater in a first preferred embodiment according to the invention.

FIG. 5 is a block diagram showing an optical amplifier repeater in the first preferred embodiment according to the invention. In FIG. 5, 3c is a third optical coupler, 3d is a fourth optical coupler, 4c is a third optical attenuator, 4d is a fourth optical attenuator, 5a is a first light-reflecting means (which is composed of, e.g., an optical grating), 5b is a second light-reflecting means, 5c is a third light-reflecting means, 5d is a fourth light-reflecting means, and 6a, 6b, 6c and 6d are reflectionless terminals.

As shown also in FIG. 5, the up and down lines are symmetrical with each other. Therefore, in the explanations below, only the transferring of supervisory signal light from the up optical-fiber transmission line to the down optical-fiber transmission line is explained.

Also, as a matter of convenience for explanation, at each optical coupler, a transmission line for main signal light is called 'first-order side transmission line' and a transmission line optically-connected to this first-order side transmission line is called 'second-order side transmission line'.

The first-order side transmission line is inserted in series into the up or down optical-fiber transmission line, and an optical signal light in the same direction as signal light transferred on the up or down optical-fiber transmission line is divided to the second-order side transmission line.

A port from which the divided optical signal light is output is called 'forward output port' of the second-order side transmission line, and its opposed port is called 'reverse output port' of the second-order side transmission line.

Figure 6:
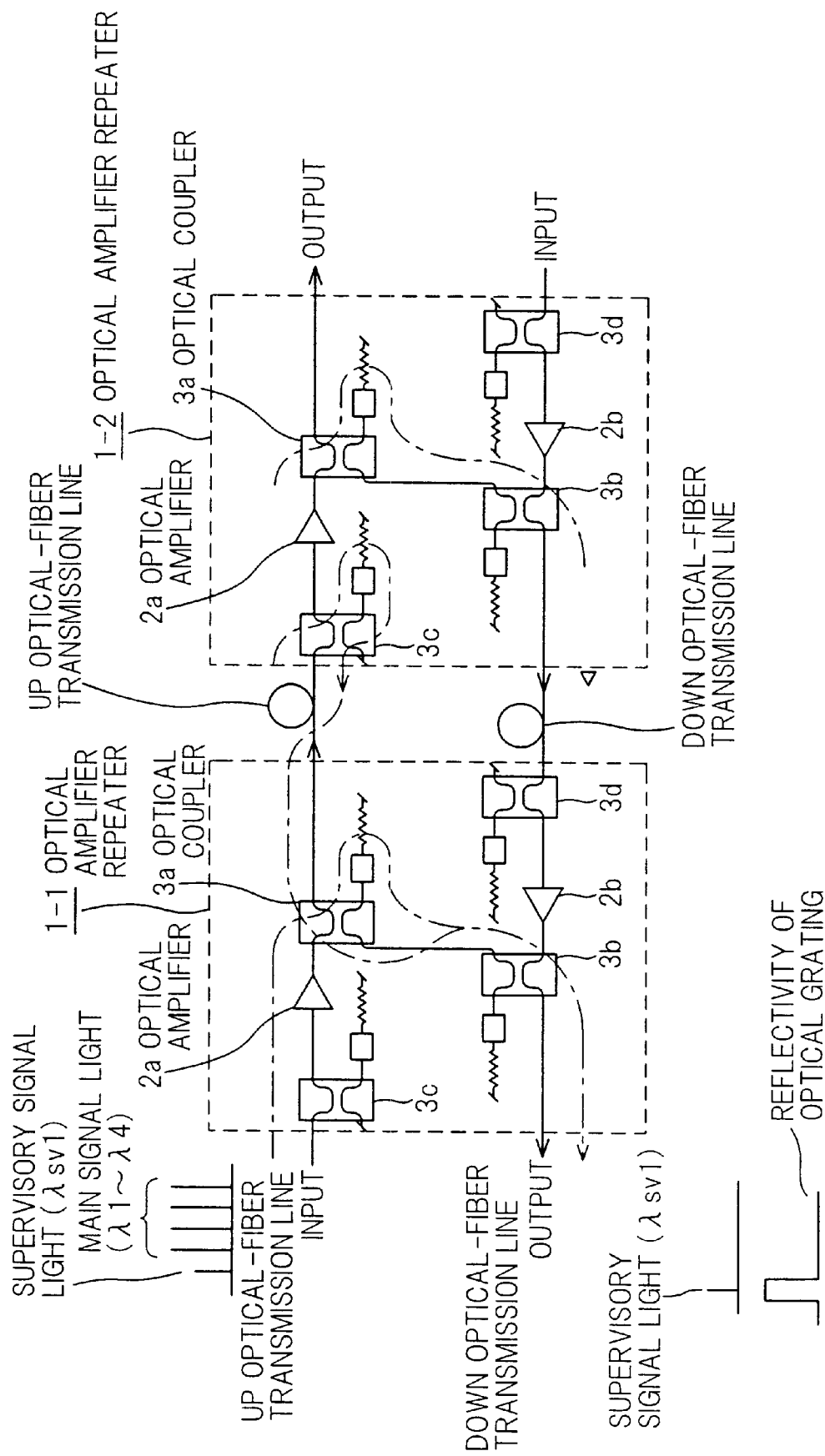
FIG. 6 is a block diagram showing the operation of the optical amplifier repeater in FIG. 5.

FIG. 6 is a block diagram showing the operation of the optical amplifier repeater 1 in FIG. 5. In FIG. 6, to explain the function of the optical coupler 3c, the two-stage connection of a pre-stage (in the up direction) optical amplifier repeater 1-1 and a post-stage (in the up direction) optical amplifier repeater 1-2 is shown.

Combined main signal light and supervisory signal light are forwarded in the same direction as that of light on the first-order side transmission line, to the second-order side transmission line of the first optical coupler 3a in the pre-stage optical amplifier repeater 1-1, and are output from the forward output port through the first optical attenuator 4a to the first light-reflecting means 5a.

Here, main signal light passes through the light-reflecting means 5a, and is then dispersed by the reflectionless terminal 6a.

Also, supervisory signal light is reflected by the light-reflecting means 5a, passing the second-order side transmission line in the forward direction from the reverse output port of the second-order side transmission line of the optical coupler 3a through the reverse output port of the second-order side transmission line of the optical coupler 3b, then coupled to the first-order side transmission line and transferred.

Next, the function of the third optical coupler 3c of the post-stage optical amplifier repeater 1-2 is explained.

Main signal light and supervisory signal light on the input side of the first optical amplifier 2a of the post-stage optical amplifier repeater 1-2 are coupled to the second-order side transmission line by the third optical coupler 3c, passing through the third optical attenuator 4c, the third light-reflecting means 5c and the third reflectionless terminal 6c. Here, only supervisory signal light is reflected and forwarded in the reverse direction through the second-order side transmission line of the optical coupler 3c. Then, supervisory signal light forwarded reversely to the first-order side transmission line of the optical coupler 3c is divided, passing reversely through the up optical-fiber transmission line to the pre-stage optical amplifier repeater 1-1, output to the direction of the down optical-fiber transmission line through the second optical coupler 3b.

Figure 7:
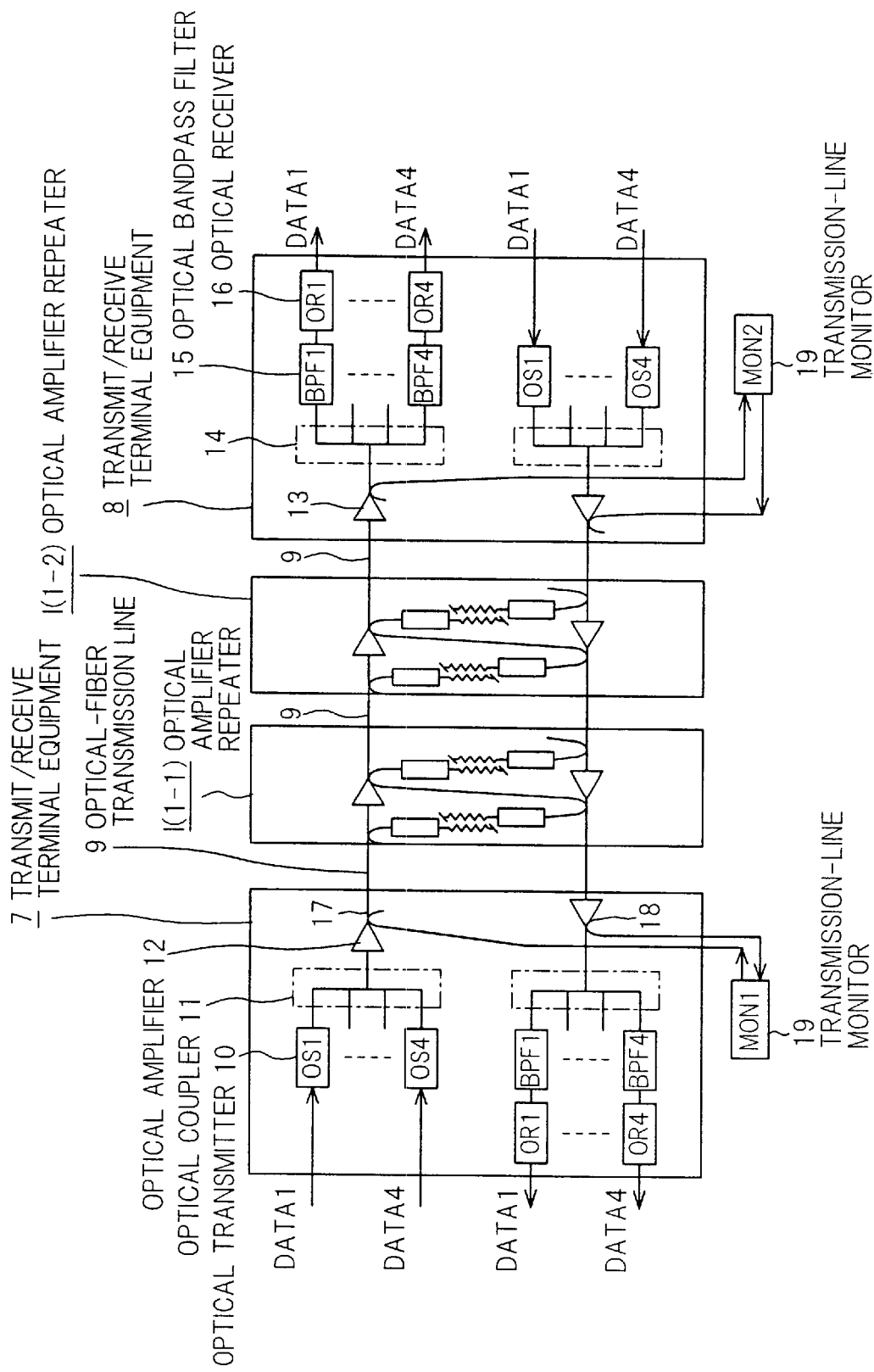
FIG. 7 is a block diagram showing an example of a transmission-line monitoring method using the optical amplifier repeater of the invention.

FIG. 7 is a block diagram showing a monitoring method in the first preferred embodiment according to the invention. In FIG. 7, 7, 8 are transmit/receive terminal equipment, 9 is an optical-fiber transmission line, 10 is an optical transmitter, 11 is an optical coupler for coupling, 12, 13 are optical amplifiers, 14 is an optical coupler for dividing, 15 is an optical bandpass filter, 16 is an optical receiver, 17, 18 are optical couplers for dividing, and 19 is a transmission-line monitoring unit.

Also in the composition in FIG. 7, the up and down optical-fiber transmission lines are symmetrical with each other. Therefore, only the up optical-fiber transmission line from the optical transmit/receive terminal equipment 7 to the optical transmit/receive terminal equipment 8 is explained below.

Also, since the operation of the optical amplifier repeaters 1-1 and 1-2 is discussed in FIG. 6, the explanations thereof are omitted here.

The optical transmitters 10 in the optical transmit/receive terminal equipment 7 generate lights with different wavelengths, which are modulated, e.g., PCM-modulated, by different signals (DATA1 to DATA4). The outputs of the optical transmitters 10 are multiplexed by the optical coupler 11 to give wavelength-multiplexed main signal light, supplied through the optical amplifier repeater 1 to the optical transmit/receive terminal equipment 8, amplified by the optical amplifier 13, demultiplexed by the optical coupler 14, separated into main signal light with each wavelength by the optical bandpass filter 15, detected by the optical receiver 16 to reproduce signals (DATA1 to DATA4).

On the other hand, supervisory signal light is transmitted by the transmission-line monitoring unit 19, coupled with main signal light on the optical-fiber transmission line 9 by the optical coupler 17. Part of this supervisory signal light is, as explained in FIG. 6, transferred to the down transmission line, divided by the optical coupler 18, supplied into the transmission-line monitoring unit 19.

The transmission-line monitoring unit 19 monitors whether the optical amplifier repeater 1 operates normally, based on the intensity amplitude, phase, frequency and time difference information of transmitted supervisory signal light and received supervisory signal light.

Figure 8:
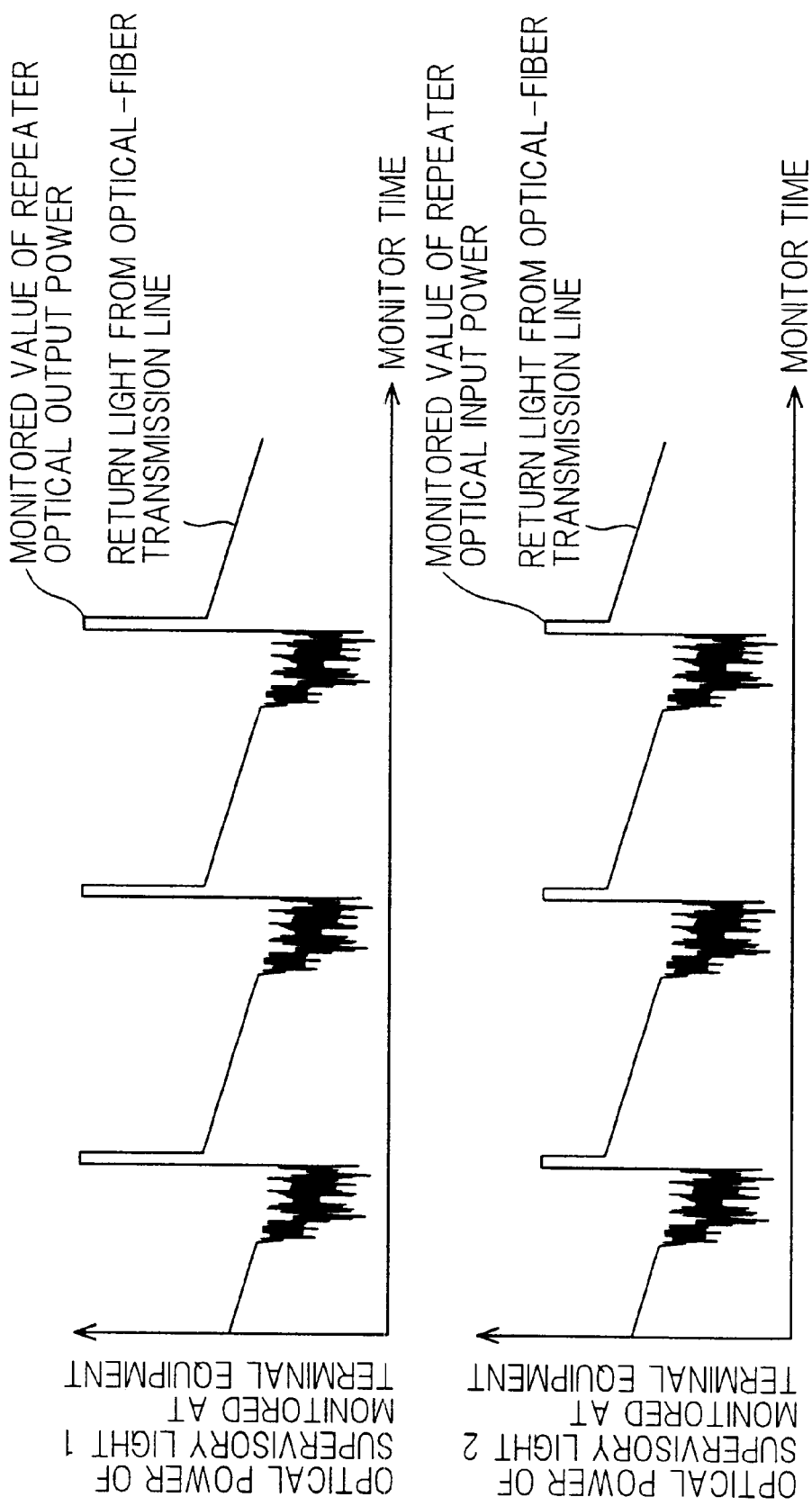
FIG. 8 is an operation time chart showing the waveform of transferred supervisory signal light observed at terminal equipment.

FIG. 8 is an operation time chart showing the change of optical power with time of supervisory signal light observed by the transmission-line monitoring unit 19 in FIG. 7.

When the reflection wavelength of the first light-reflecting means 5a is the same as the third light-reflecting means 5c, it is difficult to distinguish supervisory signal light returned at the input point of the first optical amplifier 2a from supervisory signal light returned at the output point of the first optical amplifier 2a. Therefore, it is preferable that the reflection wavelength λsv11 of the first light-reflecting means 5a is set different from the reflection wavelength λsv12 of the third light-reflecting means 5c.

When supervisory signal light with wavelength λsv11 is used, it is transmitted through the third light-reflecting means 5c. Therefore, no supervisory signal light is turned back at the input point of the first optical amplifier 2a and the supervisory signal light is turned back only at the output point of the first optical amplifier 2a.

Also, when supervisory signal light with wavelength λsv12 is used, it is transmitted through the first light-reflecting means 5a. Therefore, no supervisory signal light is turned back at the output point of the first optical amplifier 2a and the supervisory signal light is returned only at the input point of the first optical amplifier 2a.

FIG. 8 shows the intensity of supervisory signal light thus obtained. In FIG. 8, supervisory light 1 indicates supervisory signal light with wavelength λsv11, and supervisory light 2 indicates supervisory signal light with wavelength λsvl2.

Supervisory signal light with wavelength λsv11 and supervisory signal light with wavelength λsvl2 may be transmitted simultaneously and then monitored separately by the optical filter in the transmission-line monitoring unit 19.

In FIG. 8, it is shown that the ratio of supervisory signal light at the output side and input side of the optical amplifier 2a can be measured precisely.

Although the invention is explained taking the preferred embodiment above as an example, it can incur various modifications.

For example, although in the embodiment in FIG. 1, the light-reflecting means (5a, 5b, 5c, 5d) are all connected to the second-order side transmission line of the optical coupler (3a, 3b, 3c, 3d), they may be inserted directly to the up and down optical-fiber transmission lines. However, in this case, it is designed so that only part of supervisory signal light reflects.

Figure 9:
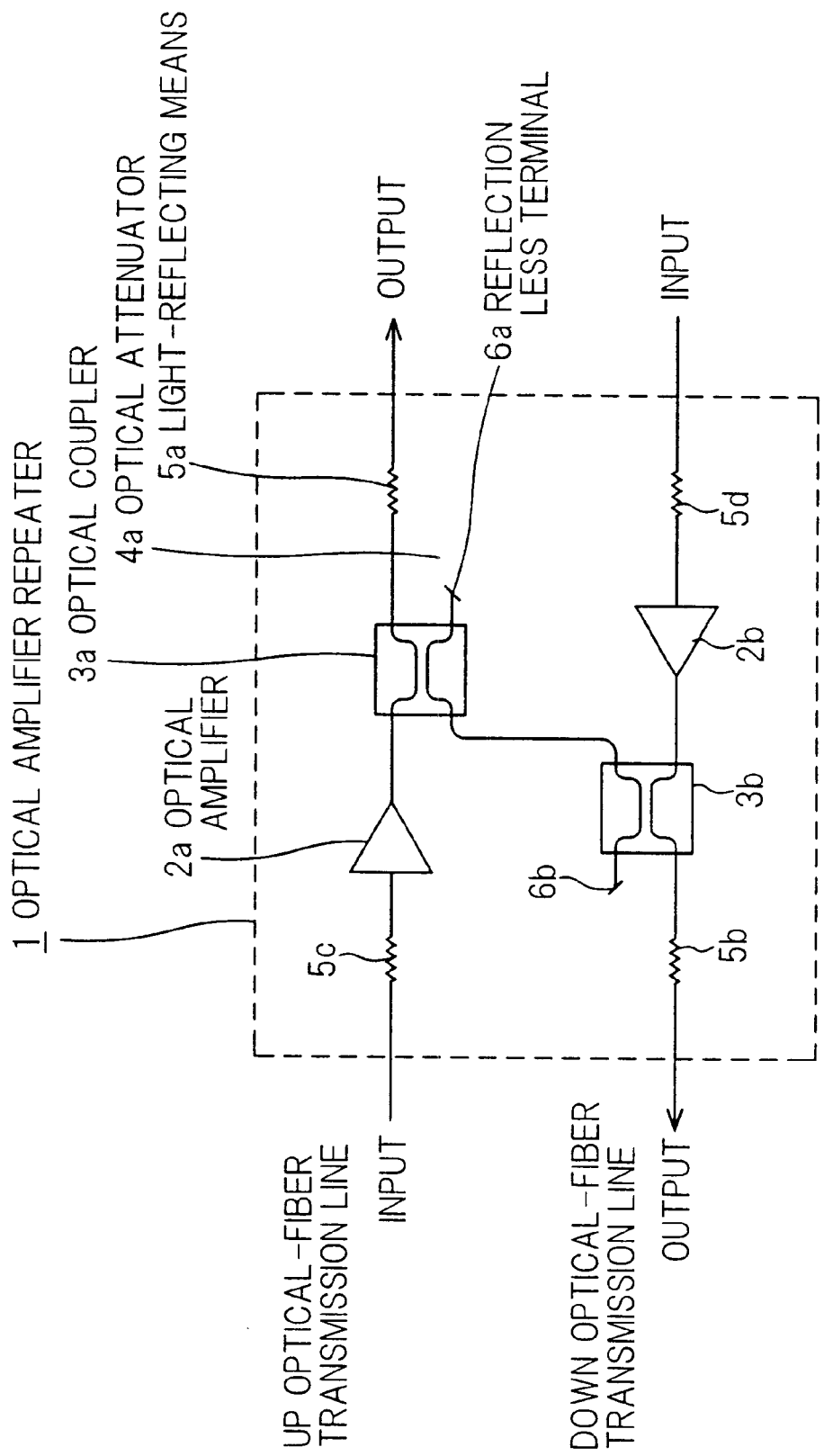
FIG. 9 is a block diagram showing an optical amplifier repeater in a second preferred embodiment according to the invention.

FIG. 9 is a block diagram showing an optical amplifier repeater in the second preferred embodiment according to the invention. Light-reflecting means (5a, 5b, 5c, 5d) in FIG. 9 can attain the same function as the light-reflecting means in FIG. 5. Also, in this case, the second-order side transmission lines of the first optical coupler 3a and second optical coupler 3b are terminated at the reflectionless terminals 6a, 6b, respectively.

Although, in the first embodiment in FIG. 5, supervisory signal light reflected by the third light-reflecting means is transferred to the opposed transmission line in the pre-stage optical amplifier repeater 1, this transfer may be conducted inside the optical amplifier repeater 1.

Figure 10:
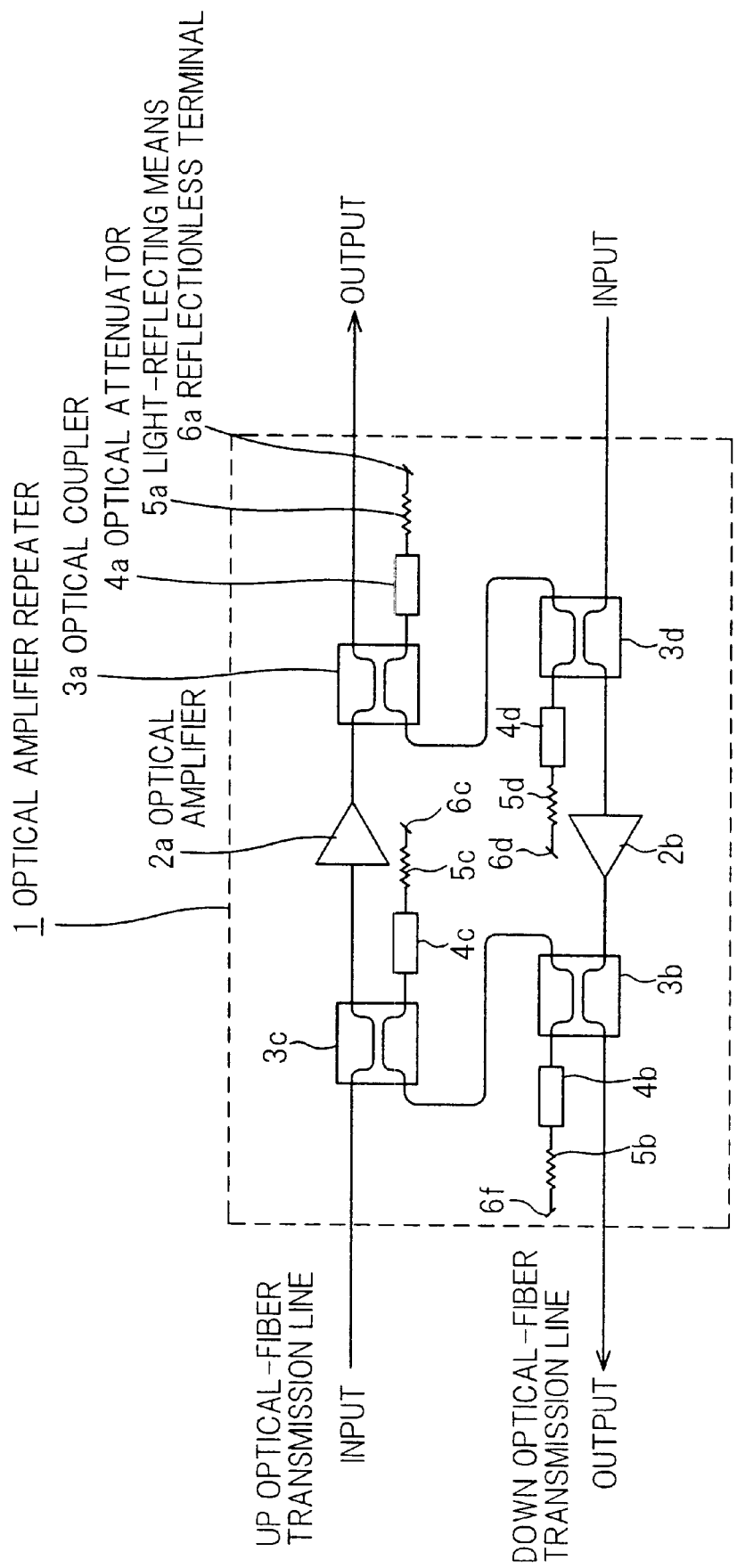
FIG. 10 is a block diagram showing an optical amplifier repeater in a third preferred embodiment according to the invention.

FIG. 10 is a block diagram showing an optical amplifier repeater in the third preferred embodiment according to the invention. In FIG. 10, the fourth optical coupler 3d is provided and supervisory signal light reflected by the third light-reflecting means 5c is transferred through the fourth optical coupler 3d to the down optical-fiber transmission line.

Similarly, supervisory signal light reflected by the fourth light-reflecting means 5d is transferred through the first optical coupler 3a to the up optical-fiber transmission line.

Figure 11:
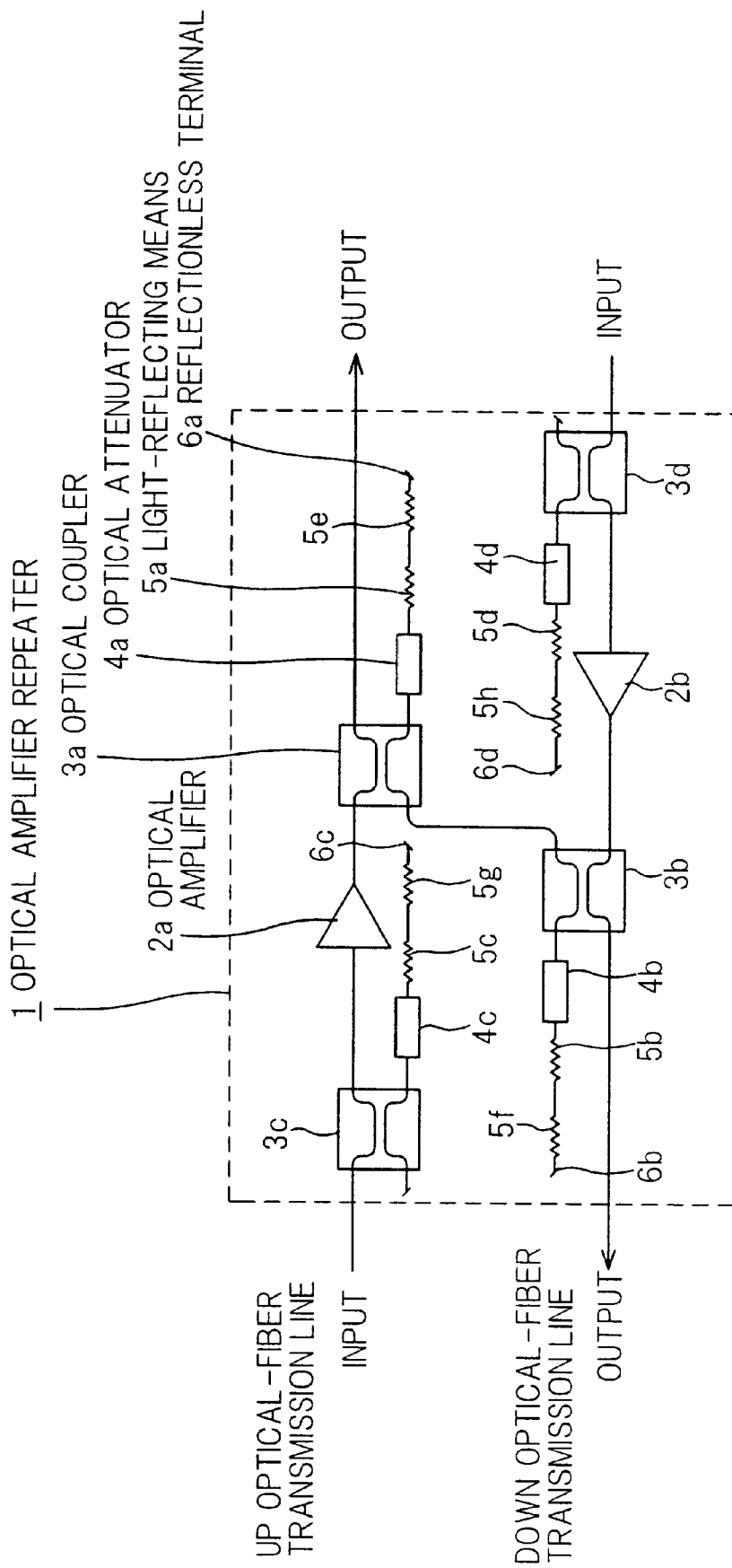
FIG. 11 is a block diagram showing an optical amplifier repeater in a fourth preferred embodiment according to the invention.

FIG. 11 is a block diagram showing an optical amplifier repeater in the fourth preferred embodiment according to the invention. In FIG. 10, shown is an example that two light-reflecting means are cascaded. A light-reflecting means 5e is cascaded to the light-reflecting means 5a, a light-reflecting means 5f to the light-reflecting means 5b, a light-reflecting means 5g to the light-reflecting means 5c and a light-reflecting means 5h to the light-reflecting means 5d.

In this embodiment, the degree of freedom for the wavelength selection of supervisory signal light can increase, or multiple supervisory signal lights with different wavelengths can be transferred.

Further, to achieve the goal of the invention, supervisory signal light need only be transferred from either of the input and output points of the optical amplifier (2a, 2b) in the optical amplifier repeater to the transmission line composing the opposed line.

Figure 12:
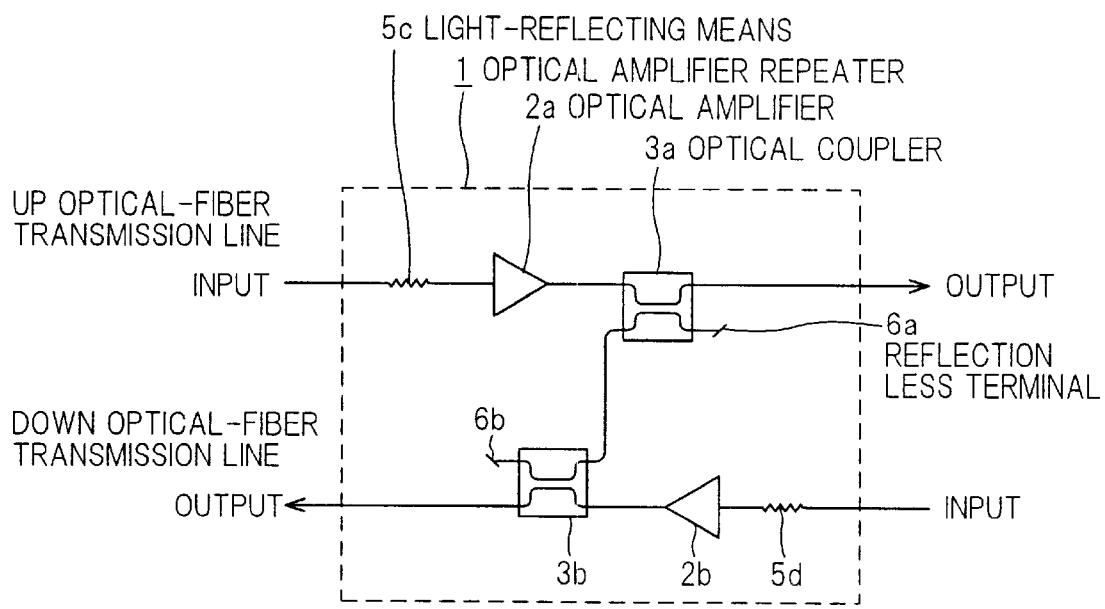
FIG. 12 is a block diagram showing an optical amplifier repeater in a fifth preferred embodiment according to the invention.

FIG. 12 is a block diagram showing an optical amplifier repeater in the fifth preferred embodiment according to the invention. In this embodiment, the light-reflecting means 5a and 5b in FIG. 9 are removed and supervisory signal light is transferred from only the input point of the optical amplifier (2a, 2b) to the transmission line composing the opposed line.

Figure 13:
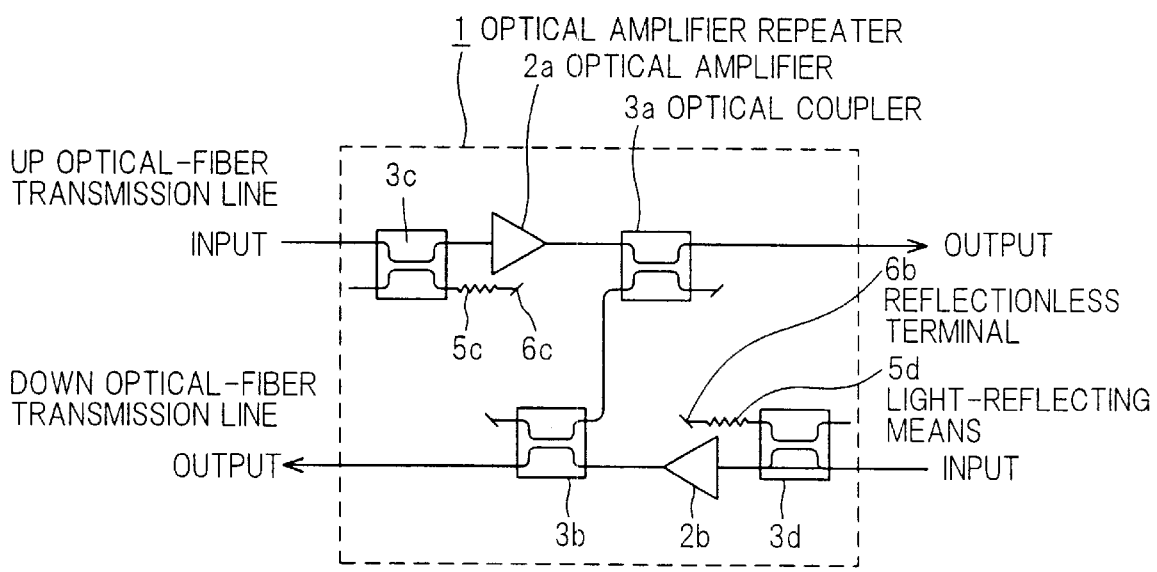
FIG. 13 is a block diagram showing an optical amplifier repeater in a sixth preferred embodiment according to the invention.

FIG. 13 is a block diagram showing an optical amplifier repeater in the sixth preferred embodiment according to the invention. In this embodiment, the light-reflecting means 5c, 5d inserted directly into the transmission line in FIG. 12 are inserted to the second-order side transmission lines of the optical couplers 3c, 3d that are provided additionally. This can operate like the circuit in FIG. 12 if the reflectivity of optical grating is increased by the coupling loss of the optical coupler.

Figure 14:
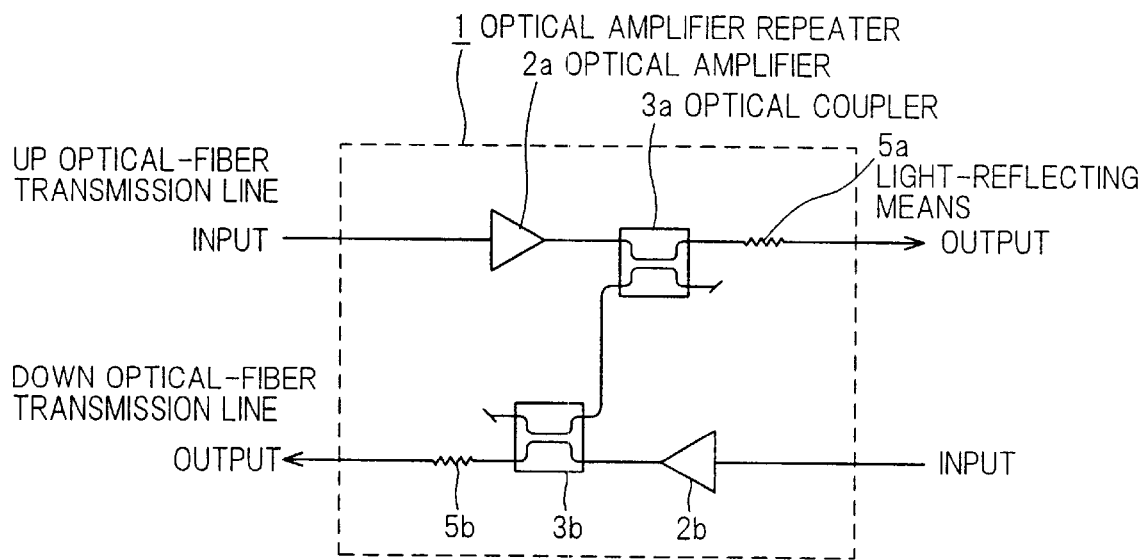
FIG. 14 is a block diagram showing an optical amplifier repeater in a seventh preferred embodiment according to the invention.

FIG. 14 is a block diagram showing an optical amplifier repeater in the seventh preferred embodiment according to the invention. The light-reflecting means 5c, 5d in FIG. 9 are removed and supervisory signal light is transferred from only the output point of the optical amplifier (2a, 2b) to the transmission line composing the opposed line.

Figure 15:
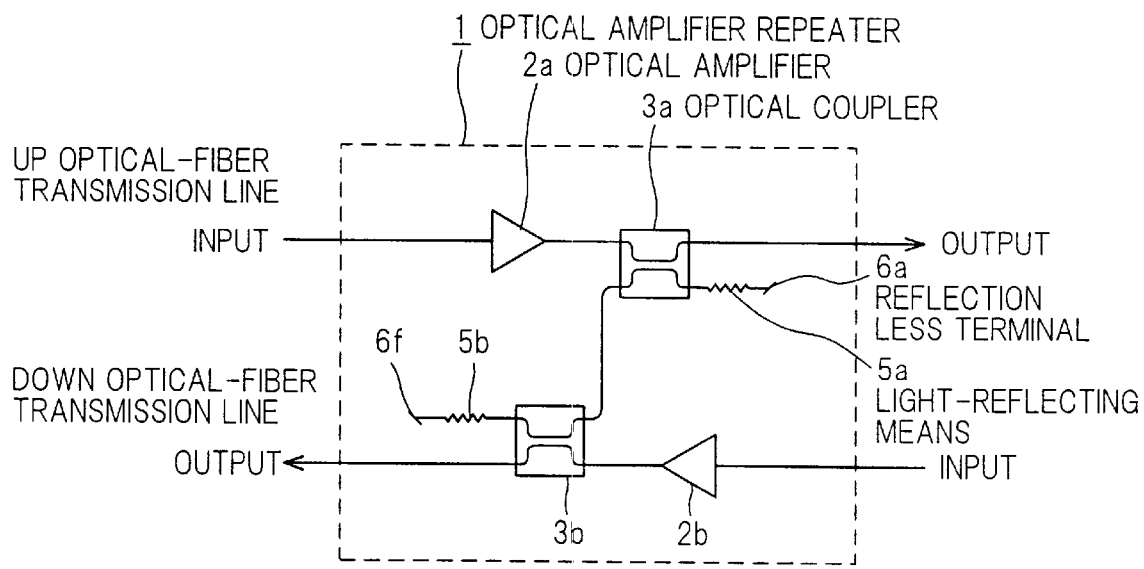
FIG. 15 is a block diagram showing an optical amplifier repeater in an eighth preferred embodiment according to the invention.

FIG. 15 is a block diagram showing an optical amplifier repeater in the eighth preferred embodiment according to the invention. In this embodiment, the light-reflecting means 5a, 5b inserted directly into the transmission line in FIG. 14 are inserted to the second-order side transmission lines of the optical couplers 3a, 3b. This can operate like the circuit in FIG. 14 if the reflectivity of optical grating is increased by the coupling loss of the optical coupler.

Figure 16:
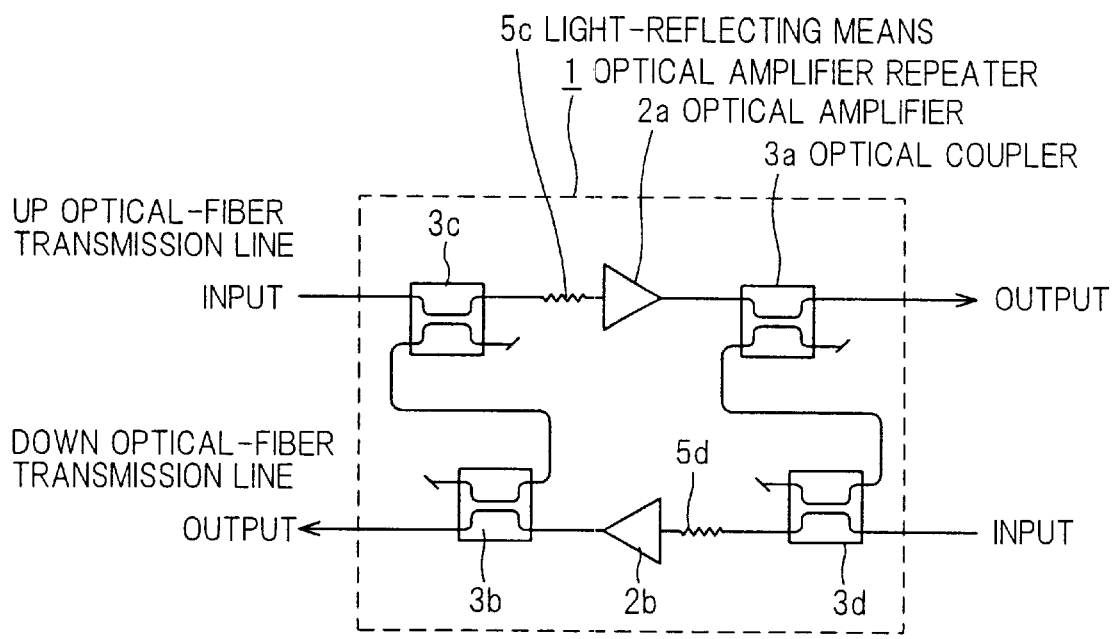
FIG. 16 is a block diagram showing an optical amplifier repeater in a ninth preferred embodiment according to the invention.

FIG. 16 is a block diagram showing an optical amplifier repeater in the ninth preferred embodiment according to the invention. Although in the composition in FIG. 13, supervisory signal light reflected by the light-reflecting means 5c, 5d is transferred to the transmission line composing the opposed line in the pre-stage optical amplifier repeater 1, in this embodiment, through the optical couplers 3c, 3d, it may be transferred to the transmission line composing the opposed line inside the concerned optical amplifier repeater 1.

Figure 17:
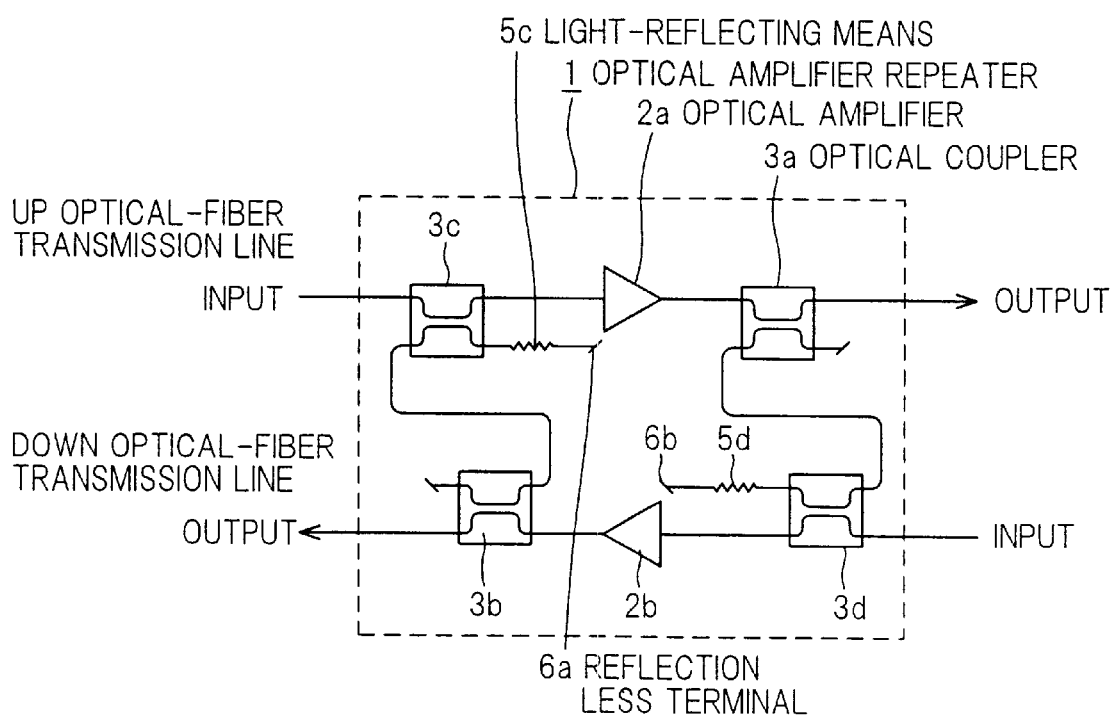
FIG. 17 is a block diagram showing an optical amplifier repeater in a tenth preferred embodiment according to the invention.

FIG. 17 is a block diagram showing an optical amplifier repeater in the tenth preferred embodiment according to the invention. In this embodiment, the light-reflecting means 5c, 5d inserted directly into the transmission line in FIG. 16 are inserted to the second-order side transmission lines of the optical couplers 3c, 3d. This can operate like the circuit in FIG. 16 if the reflectivity of optical grating is increased by the coupling loss of the optical coupler.

Figure 18:
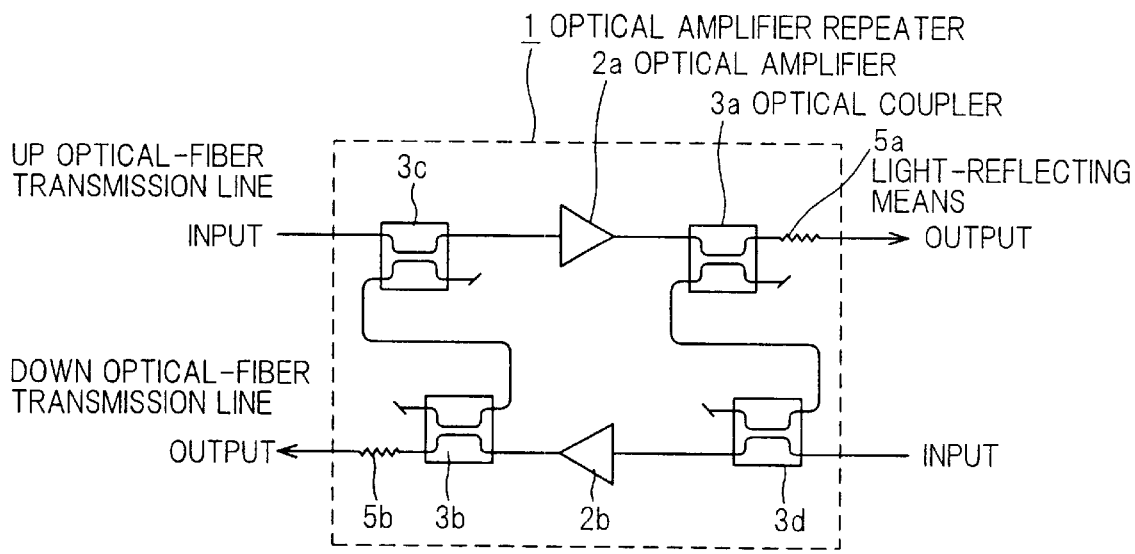
FIG. 18 is a block diagram showing an optical amplifier repeater in an eleventh preferred embodiment according to the invention.

FIG. 18 is a block diagram showing an optical amplifier repeater in the eleventh preferred embodiment according to the invention. Different from the circuit in FIG. 16 that part of supervisory signal light is reflected at the input point of the optical amplifier 2a, 2b by the light-reflecting means 5c, 5d, in this embodiment, part of the supervisory signal light is reflected at the output point of the optical amplifier 2a, 2b by the light-reflecting means 5a, 5b.

Figure 19:
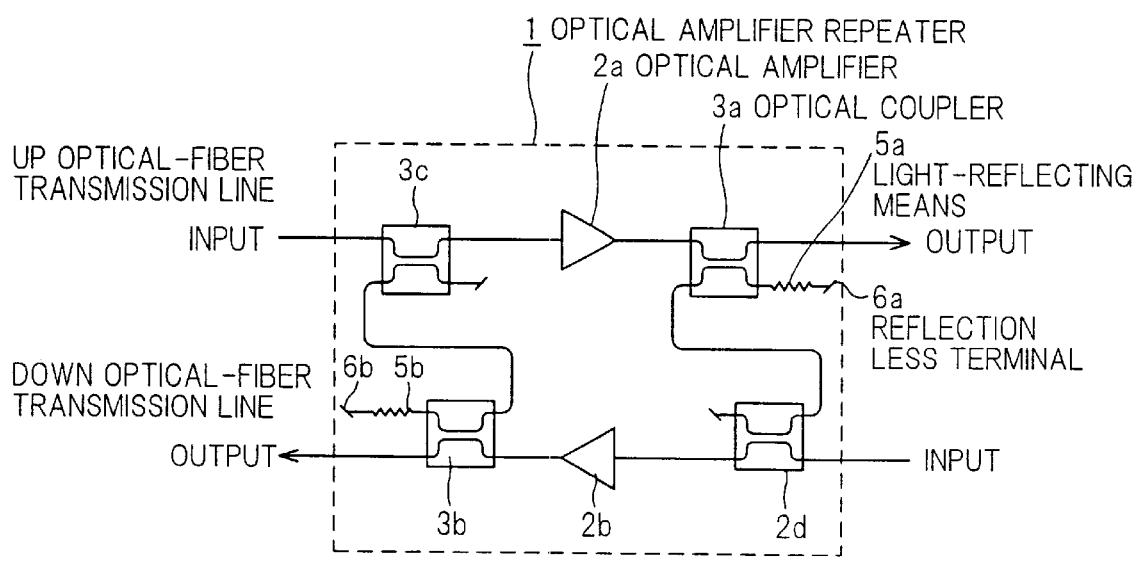
FIG. 19 is a block diagram showing an optical amplifier repeater in a twelfth preferred embodiment according to the invention.

FIG. 19 is a block diagram showing an optical amplifier repeater in the twelfth preferred embodiment according to the invention. In this embodiment, the light-reflecting means 5a, 5b inserted directly to the transmission line in FIG. 18, are inserted to the second-order side transmission line of the optical couplers 3a, 3b.

Meanwhile, the light-reflecting means used in the invention can be an optical grating, which may have a sharp wavelength characteristic to reflectivity using an optical fiber grating or optical waveguide grating.

Further, the wavelength of supervisory signal light used for the up optical-fiber transmission line may be the same as or different from that used for the down optical-fiber transmission line.

In this invention, only supervisory signal light is transferred to the opposed line by the optical grating. Therefore, supervisory signal light can be transferred without affecting the main signal light. Also, since the reflection wavelength band of the optical grating is sharpened, the wavelength of supervisory signal light may be close to the wavelength of the main signal light. Furthermore, since supervisory signal light can be transferred to the opposed line from both the output and input sides of optical amplifier, the input power, output power and amplification gain of the optical amplifier can also be monitored.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical amplifier repeater, comprising:
    a first optical amplifier that amplifies a main signal light and a supervisory signal light transmitted on an up optical-fiber transmission line;
    a second optical amplifier that amplifies the main signal light and the supervisory signal light transmitted on a down optical-fiber transmission line;
    a transfer means that transfers part of the supervisory signal light transmitted on said up optical-fiber transmission line onto said down optical-fiber transmission line, and that transfers part of the supervisory signal light transmitted on said down optical-fiber transmission line onto said up optical-fiber transmission line;
    wherein said transfer means comprises an optical amplifier output side transfer means that transfers the supervisory signal light reflected by a first light-reflecting means inserted to the output side of said first optical amplifier to the output side of said second optical amplifier and transfers supervisory signal light reflected by a second light-reflecting means inserted to the output side of said second optical amplifier to the output side of said first optical amplifier.

2. An optical amplifier repeater, according to claim 1, wherein:
    said first light-reflecting means is inserted in series to said up optical-fiber transmission line;
    said second light-reflecting means is inserted in series to said down optical-fiber transmission line;
    a first optical coupler is inserted between said first optical amplifier and said first light-reflecting means;
    a second optical coupler is inserted between said second optical amplifier and said second light-reflecting means;
    said supervisory signal light reflected by said first light-reflecting means is divided to a second-order side transmission line by said first optical coupler and then is led through an optical transmission line connecting between the second-order side transmission line of said first optical coupler and a second-order side transmission line of said second optical coupler to the second-order side transmission line of said second optical coupler, where supervisory signal light is coupled to a first-order side transmission line of said second optical coupler; and
    said supervisory signal light reflected by said second light-reflecting means is divided to the second-order side transmission line by said second optical coupler and then is led through the optical transmission line connecting between the second-order side transmission line of said first optical coupler and the second-order side transmission line of second optical coupler to the second-order side transmission line of said first optical coupler, where supervisory signal light is coupled to a first-order side transmission line of said first optical coupler.

3. An optical amplifier repeater, according to claim 2, wherein:
    said optical couplers have the first-order side transmission line inserted in series to said up or down optical-fiber transmission line, wherein light transmitted through the first-order side transmission line is coupled to the second-order side transmission line, a connectionless port on the second-order side transmission line being terminated by a reflectionless terminal, and light transmitted through the second-order side transmission line is coupled to the first-order side transmission line.

4. An optical amplifier repeater, according to claim 1, wherein:
    said first light-reflecting means is connected to the forward output port of a second-order side transmission line of a first optical coupler disposed on the output side of said first optical amplifier;
    a second light-reflecting means is connected to the forward output port of a second-order side transmission line of a second optical coupler disposed on the output side of said second optical amplifier;
    said supervisory signal light reflected by said first light-reflecting means is led from the second-order side transmission line of said first optical coupler through an optical transmission line connecting between a reverse output port of the second-order side transmission line of said first optical coupler and the reverse output port of the second-order side transmission line of said second optical coupler, where supervisory signal light is optically coupled to a first-order side transmission line of said second optical coupler; and
    said supervisory signal light reflected by said second light-reflecting means is led from the second-order side transmission line of said second optical coupler through the optical transmission line connecting between the reverse output port of the second-order side transmission line of said first optical coupler and the reverse output port of the second-order side transmission line of said second optical coupler to the second-order side transmission line of said first optical coupler, where supervisory signal light is optically coupled to a first-order side transmission line of said first optical coupler.

5. An optical amplifier repeater, according to claim 4, wherein:

said optical couplers have the first-order side transmission line inserted in series to said up or down optical-fiber transmission line, wherein light transmitted through the first-order side transmission line is coupled to the second-order side transmission line, a connectionless port on the second-order side transmission line being terminated by a reflectionless terminal, and light transmitted through the second-order side transmission line is coupled to the first-order side transmission line.

6. An optical amplifier repeater, according to claim 1, wherein:

said light-reflecting means are composed of an optical grating.

7. An optical amplifier repeater, according to claim 6, wherein:

said optical grating is an optical fiber grating.

8. An optical amplifier repeater, according to claim 6, wherein:

said optical grating is an optical waveguide grating.

9. An optical amplifier repeater, according to claim 6, wherein:

said optical grating is connected to a second-order side transmission line of an optical coupler, connected in series to an optical attenuator at one end, and terminated by a reflectionless terminal at another end.

10. An optical amplifier repeater, according to claim 6, wherein:

part or all of said optical grating is composed of a cascade of multiple optical gratings with different reflection wavelengths.

11. An optical amplifier repeater, according to claim 1, wherein:

a reflection wavelength of said first light-reflecting means is set different from that of said second light-reflecting means.

12. An optical amplifier repeater, according to claim 1, wherein:

said supervisory signal light is light modulated by a proper modulation.

13. An optical amplifier repeater, comprising:

a first optical amplifier that amplifies main signal light and supervisory signal light transmitted on an up optical-fiber transmission line;

a second optical amplifier that amplifies the main signal light and the supervisory signal light transmitted on a down optical-fiber transmission line;

a transfer means that transfers part of the supervisory signal light transmitted on said up optical-fiber transmission line onto said down optical-fiber transmission line, and that transfers part of the supervisory signal light transmitted on said down optical-fiber transmission line onto said up optical-fiber transmission line;

wherein said transfer means comprises an optical amplifier input side transfer means that transfers supervisory signal light reflected by a third light-reflecting means inserted to an input side of said first optical amplifier to an output side of said second optical amplifier, and transfers the supervisory signal light reflected by a fourth light-reflecting means inserted to an input side of said second optical amplifier to an output side of said first optical amplifier.

14. An optical amplifier repeater, according to claim 13, wherein:

said third light-reflecting means is inserted in series to said up optical-fiber transmission line;

said fourth light-reflecting means is inserted in series to said down optical-fiber transmission line;

said supervisory signal light reflected by said third light-reflecting means is transferred through first and second optical couplers in a pre-stage optical amplifier repeater to said down optical-fiber transmission line; and said supervisory signal light reflected by said fourth light-reflecting means is transferred through the first and second optical couplers in a pre-stage optical amplifier repeater to said up optical-fiber transmission line.

15. An optical amplifier repeater, according to claim 14, wherein:

said optical couplers have a first-order side transmission line inserted in series to said up or down optical-fiber transmission line, wherein light transmitted through the first-order side transmission line is coupled to a second-order side transmission line, a connectionless port on a second-order side transmission line being terminated by a reflectionless terminal, and light transmitted through the second-order side transmission line is coupled to the first-order side transmission line.

16. An optical amplifier repeater, according to claim 13, wherein:

said third light-reflecting means is connected to a forward output port of a second-order side transmission line of a third optical coupler disposed on the input side of said first optical amplifier;

said fourth light-reflecting means is connected to the forward output port of a second-order side transmission line of a fourth optical coupler disposed on the input side of said second optical amplifier;

said supervisory signal light reflected by said third light-reflecting means and then divided by said third optical coupler to be led reversely through said up optical-fiber transmission line is transferred through first and second optical couplers in a pre-stage optical amplifier repeater to said down optical-fiber transmission line; and said supervisory signal light reflected by said fourth light-reflecting means and then divided by said fourth optical coupler to be led reversely through said down optical-fiber transmission line is transferred through the first and second optical couplers.

17. An optical amplifier repeater, according to claim 16, wherein:

said optical couplers have a first-order side transmission line inserted in series to said up or down optical-fiber transmission line, wherein light transmitted through the first-order side transmission line is coupled to the second-order side transmission line, a connectionless port on the second-order side transmission line being terminated by a reflectionless terminal, and light transmitted through the second-order side transmission line is coupled to the first-order side transmission line.

18. An optical amplifier repeater, according to claim 13, wherein:

said light-reflecting means are composed of an optical grating.

19. An optical amplifier repeater, according to claim 18, wherein:

said optical grating is an optical fiber grating.

20. An optical amplifier repeater, according to claim 18, wherein:
said optical grating is an optical waveguide grating.

21. An optical amplifier repeater, according to claim 18, wherein:
said optical grating is connected to a second-order side transmission line of an optical coupler, connected in series to an optical attenuator at one end, and terminated by a reflectionless terminal at another end.

22. An optical amplifier repeater, according to claim 18, wherein:
part or all of said optical grating is composed of a cascade of multiple optical gratings with different reflection wavelengths.

23. An optical amplifier repeater, according to claim 13, wherein:
a reflection wavelength of said third light-reflecting means is set different from that of said fourth light-reflecting means.

24. An optical amplifier repeater, according to claim 13, wherein:
said supervisory signal light is light modulated by a proper modulation.

25. An optical amplifier repeater, comprising:
a first optical amplifier that amplifies main signal light and supervisory signal light transmitted on an up optical-fiber transmission line;
a second optical amplifier that amplifies main signal light and supervisory signal light transmitted on a down optical-fiber transmission line;
a transfer means that transfers part of supervisory signal light transmitted on said up optical-fiber transmission line onto said down optical-fiber transmission line, and that transfers part of supervisory signal light transmitted on said down optical-fiber transmission line onto said up optical-fiber transmission line;
wherein said transfer means comprises an optical amplifier output side transfer means that transfers supervisory signal light reflected by a first light-reflecting means inserted to an output side of said first optical amplifier to an output side of said second optical amplifier, and transfers supervisory signal light reflected by a second light-reflecting means inserted to the output side of said second optical amplifier to the output side of said first optical amplifier, and an optical amplifier input side transfer means that transfers supervisory signal light reflected by a third light-reflecting means inserted to the input side of said first optical amplifier to output side of said second optical amplifier, and transfers supervisory signal light reflected by a fourth light-reflecting means inserted to an input side of said second optical amplifier to the output side of said first optical amplifier.

26. An optical amplifier repeater, according to claims 25, wherein:
said first light-reflecting means is connected to a forward output port of a second-order side transmission line of a first optical coupler disposed on the output side of said first optical amplifier;
said second light-reflecting means is connected to the forward output port of a second-order side transmission line of a second optical coupler disposed on the output side of said second optical amplifier;
said supervisory signal light reflected by said first light-reflecting means is led from the second-order side transmission line of said first optical coupler through an optical transmission line connecting between a reverse output port of the second-order side transmission line of said first optical coupler and a reverse output port of the second-order side transmission line of said second optical coupler to the second-order side transmission line of said second optical coupler, where supervisory signal light is optically coupled to a first-order side transmission line of said second optical coupler;
said supervisory signal light reflected by said second light-reflecting means is led from the second-order side transmission line of said second optical coupler through the optical transmission line connecting between the reverse output port of the second-order side transmission line of said first optical coupler and the reverse output port of the second-order side transmission line of said second optical coupler to the second-order side transmission line of said first optical coupler, where supervisory signal light is optically coupled to a first-order side transmission line of said first optical coupler;
said third light-reflecting means is connected to the forward output port of the second-order side transmission line of a third optical coupler disposed on the input side of said first optical amplifier;
said fourth light-reflecting means is connected to the forward output port of the second-order side transmission line of a fourth optical coupler disposed on the input side of said second optical amplifier;
supervisory signal light reflected by said third light-reflecting means and then divided by said third optical coupler to be led reversely through said up optical-fiber transmission line is transferred through the first and second optical couplers in a pre-stage optical amplifier repeater to said down optical-fiber transmission line; and
supervisory signal light reflected by said fourth light-reflecting means and then divided by said fourth optical coupler to be led reversely through said down optical-fiber transmission line is transferred through the first and second optical couplers in a pre-stage optical amplifier repeater to said up optical-fiber transmission line.

27. An optical amplifier repeater, according to claim 26, wherein:
said optical couplers have the first-order side transmission line inserted in series to said up or down optical-fiber transmission line, wherein light transmitted through the first-order side transmission line is coupled to the second-order side transmission line, a connectionless port on the second-order side transmission line being terminated by a reflectionless terminal, and light transmitted through the second-order side transmission line is coupled to the first-order side transmission line.

28. An optical amplifier repeater, according to claim 25, wherein:
said light-reflecting means are composed of an optical grating.

29. An optical amplifier repeater, according to claim 28, wherein:
said optical grating is an optical fiber grating.

30. An optical amplifier repeater, according to claim 28, wherein:
said optical grating is an optical waveguide grating.

31. An optical amplifier repeater, according to claim 28, wherein:
said optical grating is connected to a second-order side transmission line of an optical coupler, connected in series to an optical attenuator at one end, and terminated by a reflectionless terminal at another end.

32. An optical amplifier repeater, according to claim 28, wherein:

part or all of said optical grating is composed of a cascade of multiple optical gratings with different reflection wavelengths.

33. An optical amplifier repeater, according to claim 25, wherein:

a reflection wavelength of said first light-reflecting means is different from that of said third light-reflecting means, and the reflection wavelength of said second light-reflecting means is different from that of said fourth light-reflecting means.

34. An optical amplifier repeater, according to claim 25, wherein:

a reflection wavelength of said first light-reflecting means is set different from that of said second light-reflecting means.

35. An optical amplifier repeater, according to claim 25, wherein:

said supervisory signal light is light modulated by a proper modulation.

36. An optical amplifier repeater, comprising:

a first optical amplifier that amplifies a main signal light and a supervisory signal light transmitted on an up optical-fiber transmission line;

a second optical amplifier that amplifies the main signal light and the supervisory signal light transmitted on a down optical-fiber transmission line;

a transfer means that transfers part of the supervisory signal light transmitted on said up optical-fiber transmission line onto said down optical-fiber transmission line, and that transfers part of the supervisory signal light transmitted on said down optical-fiber transmission line onto said up optical-fiber transmission line;

wherein said transfer means comprises a first light-reflecting means that is connected to a forward output port of a second-order side transmission line of a first optical coupler disposed on the output side of said first optical amplifier, a second light-reflecting means that is connected to the forward output port of the second-order side transmission line of a second optical coupler disposed on an output side of said second optical amplifier, a third light-reflecting means that is connected to the forward output port of the second-order side transmission line of a third optical coupler disposed on an input side of said first optical amplifier, a fourth light-reflecting means that is connected to the forward output port of the second-order side transmission line of a fourth optical coupler disposed on the input side of said second optical amplifier, an optical transmission line that connects between a reverse output port of the second-order side transmission line of said fourth optical coupler and a reverse output port of the second-order side transmission line of said first optical coupler, and an optical transmission line that connects between a reverse output port of the second-order side transmission line of said second optical coupler and a reverse output port of the second-order side transmission line of said third optical coupler.

37. An optical amplifier repeater, according to claim 36, wherein:

said light-reflecting means are composed of an optical grating.

38. An optical amplifier repeater, according to claim 37, wherein:

said optical grating is an optical fiber grating.

39. An optical amplifier repeater, according to claim 37, wherein:

said optical grating is an optical waveguide grating.

40. An optical amplifier repeater, according to claim 37, wherein:

said optical grating is connected to a second-order side transmission line of an optical coupler, connected in series to an optical attenuator at one end, and terminated by a reflectionless terminal at another end.

41. An optical amplifier repeater, according to claim 37, wherein:

part or all of said optical grating is composed of a cascade of multiple optical gratings with different reflection wavelengths.

42. An optical amplifier repeater, according to claim 36, wherein:

a reflection wavelength of said first light-reflecting means is different from that of said third light-reflecting means, and the reflection wavelength of said second light-reflecting means is different from that of said fourth light-reflecting means.

43. An optical amplifier repeater, according to claim 36, wherein:

a reflection wavelength of said first light-reflecting means is set different from that of said second light-reflecting means.

44. An optical amplifier repeater, according to claim 36, wherein:

said optical couplers have a first-order side transmission line inserted in series to said up or down optical-fiber transmission line, wherein light transmitted through the first-order side transmission line is coupled to the second-order side transmission line, a connectionless port on the second-order side transmission line being terminated by a reflectionless terminal, and light transmitted through the second-order side transmission line is coupled to the first-order side transmission line.

45. An optical amplifier repeater, according to claim 36, wherein:

said supervisory signal light is light modulated by a proper modulation.

* * * * *